United States Patent
Sirkar

[19]

[11] Patent Number: 6,156,096
[45] Date of Patent: *Dec. 5, 2000

[54] GAS SEPARATION USING HOLLOW FIBER CONTAINED LIQUID MEMBRANE

[75] Inventor: Kamalesh K. Sirkar, Berkeley Heights, N.J.

[73] Assignee: Applied Membrane Technology, Inc., Minnetonka, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/824,302

[22] Filed: Mar. 26, 1997

Related U.S. Application Data

[63] Continuation of application No. 08/564,401, Nov. 29, 1995, abandoned, which is a continuation of application No. 08/216,711, Mar. 23, 1994, abandoned.

[51] Int. Cl.$^7$ .................................................... B01D 53/22
[52] U.S. Cl. ................................ 95/44; 95/51; 96/5; 96/8
[58] Field of Search .................................. 95/44, 45, 51; 96/5, 8, 10–14; 55/524

[56] References Cited

U.S. PATENT DOCUMENTS

| | | | |
|---|---|---|---|
| 3,911,080 | 10/1975 | Mehl et al. | 95/45 X |
| 4,115,514 | 9/1978 | Ward, III | 95/44 X |
| 4,147,754 | 4/1979 | Ward, III | 95/44 X |
| 4,174,374 | 11/1979 | Matson | 95/44 X |
| 4,187,086 | 2/1980 | Walmet et al. | 95/44 |
| 4,710,205 | 12/1987 | Deetz et al. | 96/5 |
| 4,750,918 | 6/1988 | Sirkar | 95/44 |
| 4,824,444 | 4/1989 | Nomura | 55/16 |
| 4,973,434 | 11/1990 | Sirkar et al. | 96/5 X |
| 5,100,555 | 3/1992 | Matson | 95/44 |
| 5,110,326 | 5/1992 | Sirkar et al. | 96/5 |
| 5,281,254 | 1/1994 | Birbara et al. | 95/44 |

FOREIGN PATENT DOCUMENTS

| | | | |
|---|---|---|---|
| 0451715 | 10/1991 | European Pat. Off. | 96/8 |

OTHER PUBLICATIONS

Cooley et al., "Field Tests Show Membrane Processing Attractive", *Chem. Eng. Prog.*, vol. 81, p. 45 (1985).
Matson et al., "Separation of Gases with Synthetic Membranes", *Chem. Eng. Sci.*, vol. 38, p. 503 (1983).
Sequpta et al., "Membrane Gas Separation", Progress in Filtration and Separations, R.J. Wakeman, Ed., Elsevier, Amsterdam, vol. 4, p. 289 (1986).
Stannett "The Transport of Gases in Synthetic Membranes—an Historic Perspective", *J.Mem. Sci.*, vol. 3, p. 97 (1978).
Kimura et al. "Industrial Applications of Facilitated Transport", Recent Developments in Separation Science, N.N. Li. Ed., CRC Pess, West Palm Beach, FL., vol. 5, p. 11 (1979).
Brennan et al., "Natural Gas Separation Using Supported Liquid Membranes", *AIChE J.*, vol. 32W, p. 1558 (1986).

(List continued on next page.)

*Primary Examiner*—Robert H. Spitzer
*Attorney, Agent, or Firm*—Haugen Law Firm PLLP

[57] ABSTRACT

A method of separating at least one gaseous component from a feed comprising a mixture of gases using a liquid membrane barrier and a sweep fluid is disclosed that includes selecting a sweep gas or a sweep liquid membrane and providing a treatment zone in a treatment chamber having a plurality of hydrophobic microporous hollow fibers, the treatment chamber having opposed end walls with ports including feed and membrane inlets and a sweep outlet at one end and a sweep inlet and a feed and membrane outlets at the opposed end and a plurality of hydrophobic elongated microporous hollow fibers extending between the feed and sweep inlet ports and feed and sweep outlet ports respectively and arranged for counter-current flow of feed gas and sweep fluids therethrough. A liquid membrane, a feed gas and a sweep fluid are delivered into each respective inlet port under conditions wherein the static pressure in the feed is higher than in the sweep and wherein the static pressure in the membrane liquid is maintained at a level which is substantially higher than the pressure within either of the hollow fibers containing the feed gases or sweep fluids.

4 Claims, 3 Drawing Sheets

OTHER PUBLICATIONS

Brennan et al., "The Use of Swollen Silicone Rubber Membranes for Natural Gas Separations", *ICOM '87*, Tokyo, JP (1987).

Majumdar et al., "A New Liquid Membrane Technique for Gas Separation", *AIChE J.*, vol. 34, p. 1135 (1988).

Kaka et al., "Natural Gas Separation by Oil–Swollen Membranes", *Proc. Int. Mem. Tech. Conf.*, Sydney, AU (1988).

Ward "Immobilized Liquid Membranes", *Recent Developments in Separation Science*, N.N. Li, Ed., CRC Press, Cleveland, OH, vol. 1, p. 153 (1972).

Hughes, et al, "Olefin Separation by Facilitated Transport Membranes", *Recent Developments in Separation Science*, N.N.Li, J.M. Calo, Eds., vol. 9, CRC Press, Boca Raton, FL (1986).

Kimura et al., "Fuel Gas Purification with Permselective Membranes", *Sep. Sci. Tech.*, vol. 15, p. 1115 (1980).

Guha et al. "Gas Separation Modes in a Hollow Fiber Contained Liquid Membrane Permeator", *Ind. Eng. Chem. Res.* vol. 31, p. 593 (1992).

Majumdar, et al., "Liquid Membrane Purification of Biogas" prepared for NY State Energy Research Dev. Authority, Report 91–9 (Mar. 1991).

Bhave et al., "Gas Permeation and Separation with Aqeuous Membranes Inmobolized in Microporous Hydrophobic Hollow Fibers", *Liquid Membranes–Theory and Applications*, ACS Symposium Series 347; Amer. Chem. Soc., Washington, DC (1987).

Guha et al., "Facilitated Transport of $CO_2$ Through Immobilized Liquid Membrane of Aqueous Diethanolamine", *Ind. Eng. Chem. Res.*, vol. 29, p. 2093 (1990).

Majumdar et al., "Hollow–Fiber Contained Liquid Membrane", pp. 764–797 (date unknown).

GAS SEPARATION USING HOLLOW FIBER CONTAINED LIQUID MEMBRANE

This is a Continuation of application Ser. No. 08/564,401, filed Nov. 29, 1995, now abandoned which was a continuation of parent application Ser. No. 08/216,711, filed on Mar. 23, 1994, now abandoned.

BACKGROUND OF THE INVENTION

The present invention relates generally to a method and apparatus for the separation of at least one gaseous component from a mixture of gaseous components from a feed mixture. More specifically, the present invention relates to a method of separation of a gaseous component from a mixture of gases contained in a gaseous feed stream.

In the past, various techniques have been employed for the separation of components from gaseous mixtures, such as by chemical and physical absorption techniques. These techniques involve the dispersion of a gas in the absorbent liquid as bubbles or gas flowing counter-current to a liquid which is in the form of drops or a thin film in spray towers, packed towers, and the like. Such devices, however, suffer from flooding, loading, entrainment, and the like. The recovery of condensable hydrocarbons from natural gas, on the other hand, is achieved by highly energy intensive cryogenic processes such as refrigerated absorption in heavy oils or cryogenic distillation.

A less energy intensive process which can be an alternative to the ones mentioned above is membrane separation. Gas separations using polymeric membranes have met with some success (T. E. Cooley and W. L. Dethloff, "Field Tests Show Membrane Processing Attractive", *Chem. Eng. Prog.*, Vol. 81, p.45 (1985)). However, the wider use of polymeric membranes for gas separations has been inhibited by the low selectivity and permeability values they exhibit (S. L. Matson et al., "Separation of Gases with Synthetic Membranes", *Chem. Eng. Sci.*, Vol. 38, p.503 (1983); A. Sengupta and K. K. Sirkar, "Membrane Gas Separation", *Progress in Filtration and Separations*, R. J. Wakeman, Ed., Elsevier, Amsterdam, Vol.4, p.289 (1986)). V. T. Stannett, "The Transport of Gases in Synthetic Membranes—an Historic Perspective", *J. Mem. Sci.*, Vol. 3, p.97 (1978) has provided a historical perspective on gas transport through polymeric membranes. Liquid membranes, on the other hand, are known to possess high species permeabilities and selectivities in gas permeation (S. G. Kimura et al., "Industrial Applications of Facilitated Transport", *Recent Developments in Separation Science*, N. N. Li, Ed., CRC Press, West Palm Beach, Fla., Vol.5, p.11 (1979); M. S. Brennan et al., "Natural Gas Separation Using Supported Liquid Membranes", *AIChE J.*, Vol. 32, p.1558 (1986) and M. S. Brennan et al., "The Use of Swollen Silicone Rubber Membranes for Natural Gas Separations", *ICOM '87*, Tokyo, Japan (1987); S. Majumdar et al., "A New Liquid Membrane Technique for Gas Separation", *AIChE J.*, Vol. 34, p.1135 (1988); K. M. Kaka et al., "Natural Gas Separation by Oil-Swollen Membranes", *Proc. Int. Mem. Tech. Conf.*, Sydney, Australia (1988)). Furthermore, using the principle of facilitated transport even higher species selectivities and permeabilities may be achieved (W. L. Ward, "Immobilized Liquid Membranes", *Recent Developments in Separation Science*, N. N. Li, Ed., CRC Press, Cleveland, Ohio, Vol. 1, p.153 (1972); R. D. Hughes et al., "Olefin Separation by Facilitated Transport Membranes", *Recent Developments in Separation Science*, N. N. Li, J. M. Calo, Eds., Vol. 9, CRC Press, Boca Raton, Fla. (1986)). An early use of a liquid as a separation barrier for gas separation was achieved by immobilizing it in the pores of a microporous substrate where it was kept in place by capillary action of the micropores, these types of membranes were called immobilized liquid membranes (ILM) (W. L. Ward, "Immobilized Liquid Membranes", *Recent Developments in Separation Science*, N. N. Li, Ed., CRC Press, Cleveland, Ohio, Vol. 1, p.153 (1972)). The liquids used as membranes are chosen on the basis of gas solubility, selectivity and volatility. The microporous support is chosen on the basis of its inertness, small pore size, thinness, and the like. This ILM technique along with few other variations have several deficiencies for gas separation, the most important ones being poisoning (Matson et al., "Separation of Gases with Synthetic Membranes", *Chem. Eng. Sci.*, Vol. 38, p.503 (1983)), loss of evaporation and the problem of humidity control (S. G. Kimura and G. F. Walmet, "Fuel Gas Purification with Permselective Membranes", *Sep. Sci. Tech.*, Vol. 15, p. 1115 (1980)), resulting in flooding of the aqueous membrane.

More recently, however, Majumdar et al., "A New Liquid Membrane Technique for Gas Separation", *AIChE J.*, Vol. 34, p.1135 (1988) developed a new liquid membrane technique known as the contained liquid membrane (CLM). Here a thin film of water or an aqueous solution is contained in the space between two thoroughly mixed sets of hydrophobic microporous hollow fibers which carry the feed and the permeate streams respectively. Since water or an aqueous solution is acting as the liquid membrane, and since it is contained between two sets of hollow microporous hydrophobic fibers, this technique is designated hollow fiber contained liquid membrane (HFCLM). The aqueous liquid membrane, which is immobilized in the shell side of the permeator, is maintained at a pressure higher than those of both gas streams, feed and permeate, to prevent physical mixing of the two gas streams. Using this technique, Guha et al., "Gas Separation Modes in a Hollow Fiber Contained Liquid Membrane Permeator", *Ind. Eng. Chem. Res.*, Vol. 31, p. 593 (1992) presented a very detailed study on the separation of mixtures of $CO_2$—$N_2$ and $CH_4$—$CO_2$ using water and 20% aqueous diethanolamine (DEA) solution as liquid membranes. This study also included experimental data and theoretically predicted results for different modes of permeator operation.

The principle of transport of species through the HFCLM is the same as in the ILM. For a non-reactive liquid acting as the liquid membrane, the permeant gas species dissolves at the feed-liquid membrane interface on the outside radius of the feed fiber, diffuses through the liquid membrane and desorbs at the sweep-liquid membrane interface at the outside radius of the sweep fiber. The microporous hollow fibers do not act as membrane barriers as such. Their pore size and wetting characteristics control the maximum allowable pressure difference between the gas stream and the liquid membrane beyond which one of the phases will get dispersed in the other.

By way of example, and in accordance with the present invention, the separation of $CO_2$—$N_2$ mixtures using a HFCLM permeator will be described. In the first example, both sets of highly intermingled microporous hydrophobic hollow fibers have a thin nonporous silicone coating. In the second example, one set of microporous hydrophobic hollow fibers has a thin non-porous silicone coating, while the other set does not. The former is illustrated in the schematic illustration designated FIG. 4 hereinbelow, with the latter being designated FIG. 5, and with FIG. 5 containing one set of silicone coated fibers and one set of uncoated microporous fibers.

The ultra-thin nonporous silicone layer (~1 μm) is located on the outer surface of the hollow fibers and it is used to prevent the membrane liquid from entering the pores of the fibers. The ultra-thin silicone coating also acts as a separation barrier since permeabilities of various species through silicone are different; the resistance to the transport of species which the coating provides is however likely to be negligible due to its thinness. In addition, the coating tends to increase the strength of the microporous fibers making them capable of handling pressures up to 200 psig and above. Thus, the feed stream and the liquid membrane can be maintained at high pressures and the strip side at a lower (e.g. atmospheric) pressure, without fiber collapse and certainly without any membrane liquid breakthrough into the permeate fiber lumen. In the technique without a non-porous coating on the fibers having a pore size around 0.03 μm, the maximum pressure differential that could be maintained was around 100 psia. Suitable hydrophobic microporous hollow fibers found useful in application to the present invention are disclosed in Nomura U.S. Pat. No. 4,824,444, assigned to the same assignee as the present invention, and the disclosure of this patent is hereby incorporated by reference.

The technique of the present invention provides a method for the continuous and steady separation of components. In particular, the technique of the present invention does not require batch processing techniques, and hence significant advantages are created and readily available.

One feed gas mixture used in our efforts consists of $CO_2$ and $N_2$ with a $CO_2$ content of either 10%, 20%, or 40%. The feed gas pressure ranges between 60 to 216 psia; pure water and 20% by weight aqueous solution of diethanolamine (DEA) are used as liquid membranes, with water alone being non-reactive with the feed gas. As indicated hereinafter, solutions of diethanolamine (DEA) are reactive with certain feed gases, with the advantages available from the use of such material being discussed hereinafter. Also, these efforts provided information on the selectivity of the liquid membranes under study. In undertaking processes in accordance with the present invention, care is given to the selection of an appropriate liquid membrane. For example, certain processes and/or techniques cannot be used with hydrocarbon membrane liquids which tend to wet the hydrophobic microporous fibers. In other words, the hydrophobic property of the coated fibers is an important consideration in undertaking certain processes in accordance with the present invention. In other instances, these configurations may employ membrane liquids such as N-decane, kerosene, as well as other such materials for recovering various species from natural gas. Those gaseous components such as ethane or other higher species are of importance.

Typically, the liquid membrane pressure is greater than the pressure within the gaseous phase of the feed. In other words, the liquid membrane pressure is typically maintained at a level greater than that of the gaseous phase within the microporous hollow fibers. Additionally, the liquid membrane pressure is typically maintained at a level greater than that within the fluid phase in the sweep hollow microporous fibers. Such an arrangement enhances the stability of the system and contributes to the ability of the system to maintain continuous and steady separation operation.

Therefore, it is a primary object of the present invention to provide an improved separation method and apparatus for achieving separation of mixtures of gases utilizing hollow fiber contained liquid membrane techniques (HFCLM), and wherein the separation is achieved through the utilization of two individual sets of coated microporous hollow fiber substrates, one set containing a feed stream, and the other containing a strip stream, and with the hollow fiber substrates being spaced apart by an immiscible liquid membrane retained outside of the fibers.

It is yet a further object of the present invention to provide an improved gaseous separation operation for separating components of mixtures of gases utilizing improved HFCLM techniques.

Other and further objects of the present invention will become apparent to those skilled in the art upon a study of the following specification, appended claims, and accompanying drawings.

IN THE DRAWINGS

Figure 4:
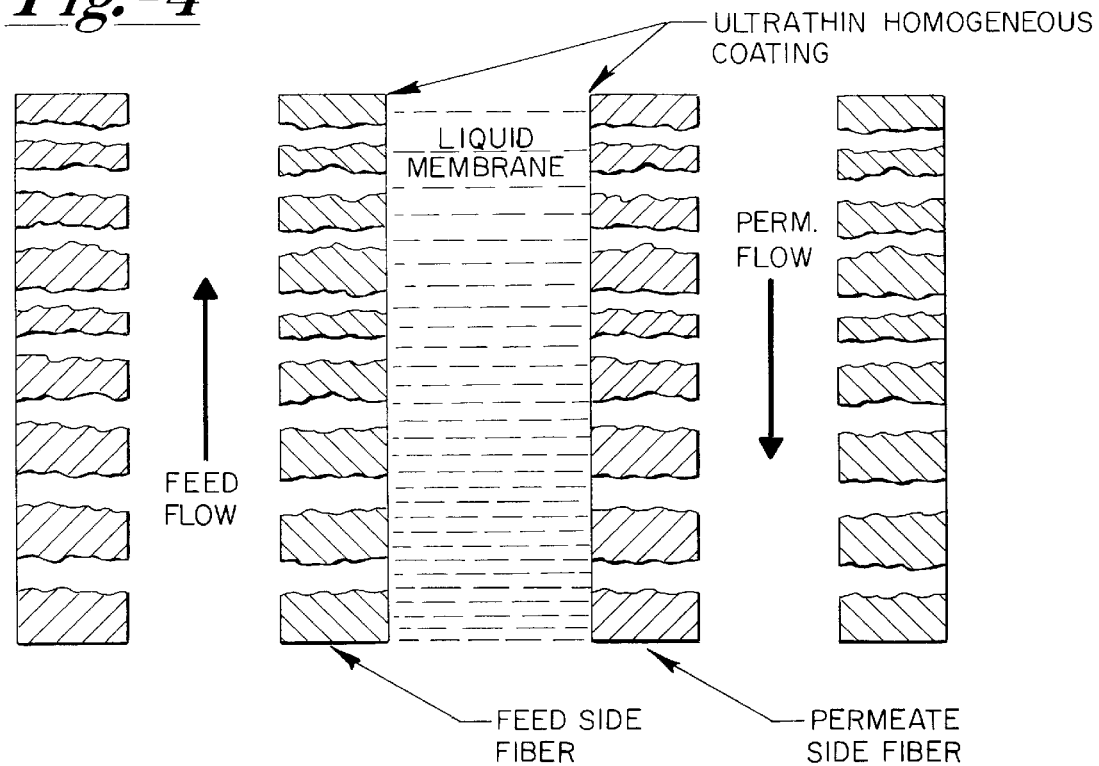
Figure 5:
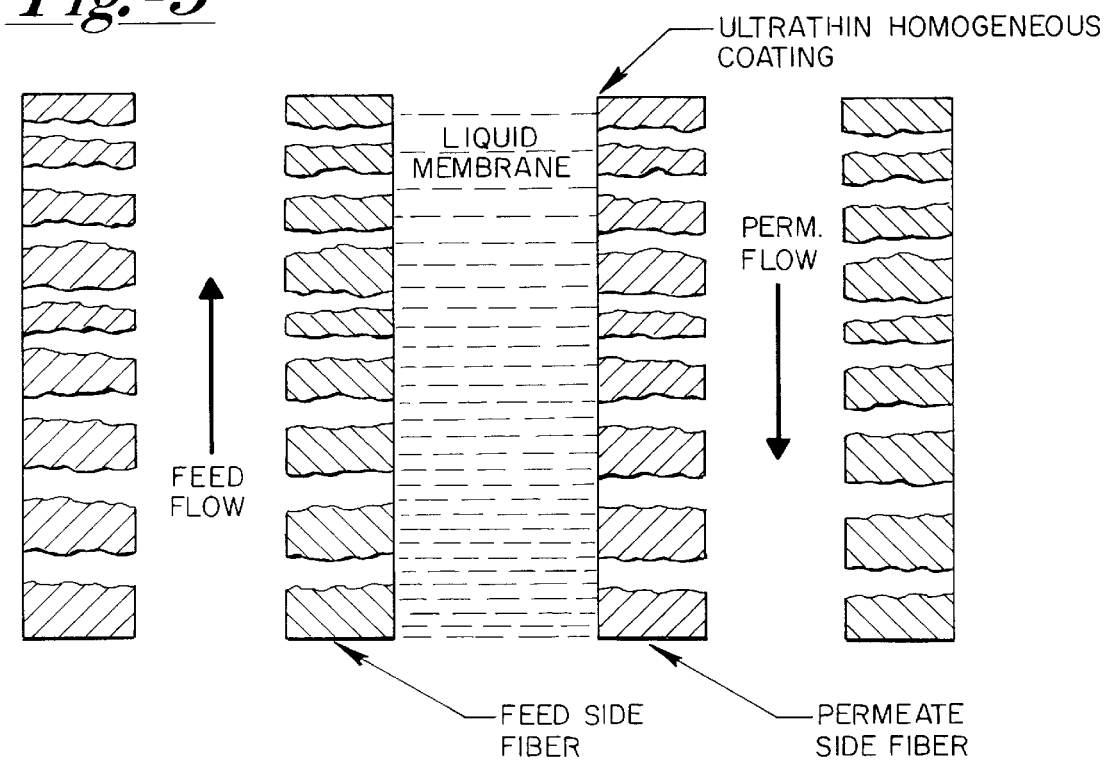

FIG. 4 is a schematic of the fibers containing the feed and permeate or sweep gas mixtures, with the aqueous phase being maintained outside the fibers, and with the fibers on both sides being coated on the outside; and, FIG. 5 is a schematic of the fibers containing the feed and permeate or sweep gas mixtures, with the aqueous phase being maintained outside the fibers, and with the feed side fibers not being coated.

DESCRIPTION OF THE PREFERRED EMBODIMENT

In order to describe the operational features of the present invention, reference is made to the procedures set forth in Example I hereinbelow.

EXAMPLE I

PREPARATION OF THE HOLLOW FIBER CONTAINED LIQUID MEMBRANE PERMEATOR FOR GAS SEPARATION

FIBER BUNDLE PREPARATION

For constructing a hollow fiber contained liquid membrane permeator (HFCLM) needed for gas separation, the following method was applied to the bundle preparation. The coated fibers of the type described in Nomura U.S. Pat. No. 4,824,444 and uncoated fibers sold by Celanese Chemical Co. of New York, N.Y. under the designated "Celanese X-10" were cut to the desired length, and placed on a flat surface, with the fibers lying next to one another, with their ends secured to the surface with adhesive tape. Once the fibers for one side, feed or sweep, were laid and secured, the fibers for the other side were placed the same way on top of the previous set. Next, the adhesive tapes were loosened and each end of each set was tightened with threads. With one set of fibers still on top of the other, the fibers were mixed by hand. A considerable quantity of water was used to aid the mixing process. A detailed description of the fiber bundle preparation process can be found in Majumdar et al., "Liquid Membrane Purification of Biogas", Prepared for the New York State Energy Research Development Authority, Report 91-9 (March 1991). Other coated fibers may also be utilized in the apparatus and techniques of the present invention. For example, either plasma-coated or other integrally-coated fibers may be employed, provided the coatings are both adherent and fast upon the surface of the microporous substrate, and capable of withstanding the exposure to the pressure differentials being employed in the system. As indicated, however, the preferred coated fibers are those indicated hereinabove.

FABRICATION OF HFCLMP SHELL

Figure 1:
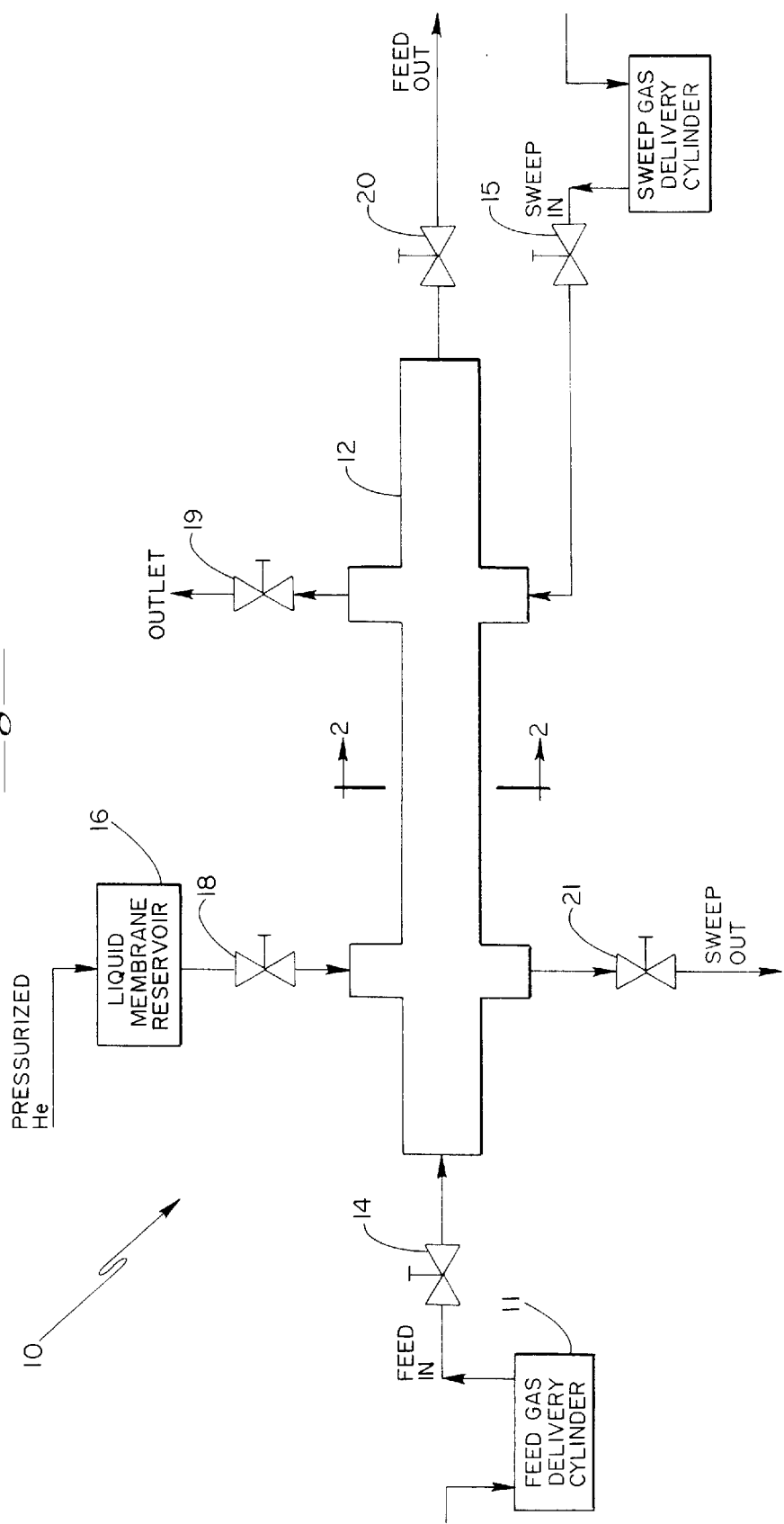
FIG. 1 is a schematic diagram showing an arrangement of the present invention for gaseous separation, utilizing a hollow fiber module with means for flow of a feed stream and a sweep stream, and also for housing a liquid membrane therewithin.

The HFCLMP shell for gas separation is illustrated in FIG. 1. The details of the structure are shown in Table I hereinbelow. The details of preparation of such permeators are, of course, known in the art and straightforward techniques are employed.

Figure 2:
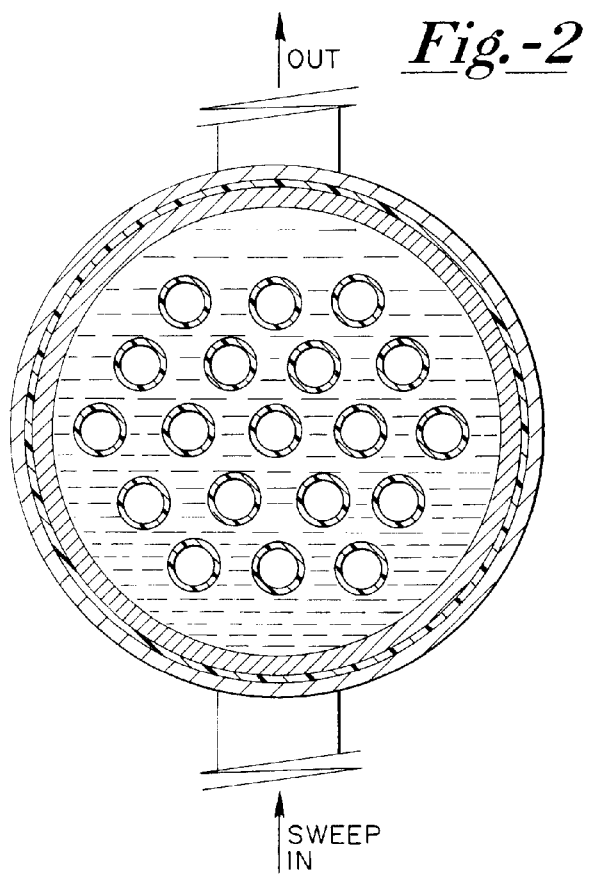
FIG. 2 is a cross-sectional view taken along the line and in the direction of the arrows 2—2 of FIG. 1, and illustrating the arrangement of components contained within the module.

A complete schematic of the HFCLM permeator is shown in FIG. 1 and a sectional view including the pipe, epoxy layer and fibers is shown in FIG. 2. The chamber includes a lining of polytetrafluoroethylene (Teflon). This Teflon lining is illustrated in the embodiment of FIG. 2. The geometric characteristics of the permeator made along with the number of fibers, mass transfer area, packing factor, and the like are shown in Table I below.

TABLE I

|  | PERMEATOR |
| --- | --- |
| Length available for coating separations (cm) | 28.0 |
| Length available for liquid membrane separations (cm) | 15.24 |
| Inside diameter (cm) | 0.238 |
| Total number of fibers | 52 |
| Number of fibers per side | 26 |
| Feed side fiber I.D./O.D. $\mu$m | 100/142 |
| Sweep side fiber I.D./O.D. $\mu$m | 100/142 |
| Type of feed fibers | coated* |
| Type of sweep fibers | coated* |
| Mass transfer area for coating only separations (cm$^2$) | 32.5 |
| Mass transfer area for liquid membrane separations (cm$^2$) | 17.7 |
| Mass transfer area per unit volume, HFCLM mode (cm$^{-1}$) | 26 |
| Fiber tortuosity ** | 3.5 |
| Fiber porosity *** | 0.2 |
| Packing factor | 0.18 |

CHEMICALS

The gases used in these studies were $CO_2$ (99.8% min.), $N_2$ (99.99% min.), 10.0% $CO_2$—$N_2$ mixture (standard), 10.2% $CO_2$—$N_2$ mixture, 38.89% $CO_2$—$_{N2}$ mixture and 20% $CO_2$—$N_2$ mixture. All the gases were obtained from Matheson Gas Products Inc. of East Rutherford, N.J. The diethanolamine (99%) was obtained from Aldrich Chemical Co. Inc. of Milwaukee, Wis.

The row identified as "length available for liquid membrane separations" shows the active internal module length to be 15.247 cm. The overall module coated fiber length is 28.0 cm, and the sections between the internal length and ends are also filled with the same liquid, but the fibers are spaced apart at the ends a distance which is greater than that required to present an effective thin liquid membrane.

EXPERIMENTAL PROCEDURE FOR GAS SEPARATION

The gas separation set up is schematically illustrated in FIGS. 1 and 2. The permeator system generally designated 10 includes a gas delivery cylinder 11 providing an inlet along feed inlet to chamber 12 through valve 14. Sweep gas is delivered from sweep gas delivery cylinder through valve 15 and into the inlet to chamber 12. Liquid membrane reservoir 16 is subjected to pressurized helium, as indicated, and delivers material through valve 18 and into chamber 12, and ultimately delivered from chamber 12 through outlet 19. The feed outlet is shown at 20 and sweep outlet at 21. All connecting lines were of ⅛th inch o.d., 0.035 inch wall thickness, 316 stainless steel. Analyses of the inlet and outlet streams were performed using a Varian 3700 gas chromatograph equipped with a thermal conductivity detector and with a Porapak N, 80/100 mesh, 6'×⅛" stainless steel column. The injector and detector temperatures were kept at 120 degrees C. and the oven temperature at a constant 40 degrees C.

A procedure was started by filling the liquid membrane reservoir 16 with the appropriate liquid. Next, the shell side outlet valve 19 of chamber 12 was opened and the membrane liquid was allowed to pass into the shell side of the chamber 12 which lay in an inclined position. After 30 to 50 cm$^3$ of liquid were collected from the shell side outlet valve, chamber 12 was placed in a horizontal position and the outlet valve 19 was closed. Then the shell side was pressurized with helium to an initial pressure of 20 to 55 psia. At this point, all other Swagelok fittings were tightened and the feed side pressure and flow rate were set. The feed inlet flow rate was initially set at a higher value with the aid of an electronic flow transducer-controller (Model 8141-0412, range 0 to 50 sccm, commercially available from Matheson Gas Products of East Rutherford, N.J.) so that the pressure inside the fibers could reach the desired level faster.

When a non-reactive liquid was acting as the membrane, the above procedure was continued by letting the feed gas into the lumen of the feed side fibers. In the case where a reactive aqueous liquid was used as the membrane, however, the procedure included the filling up of the feed and sweep gas humidifiers (500 cm$^3$ capacity) with water prior to the introduction of the feed gas into the permeator. Once they were full, 40 to 60 cm$^3$ of water were taken out to guard against the possibility of water entering the lines.

The pressurization of the feed and the shell were done simultaneously. The feed side was pressurized by allowing feed gas to flow inside the lumen of the fibers and by controlling the pressure level with the aid of a back pressure regulator (Fairchild, Epec Sales, Towaco, N.J.). The shell side was pressurized by a direct increase in pressure from the pressurization cylinder pressure regulator. The pressurization process was done slowly until the desired levels of pressure were reached. Once these levels were reached, the feed inlet gas flow rate was returned to the desired level. The feed and permeate outlet streams were sent to a gas chromatograph.

The flow rates of all streams, except for the feed and sweep side inlet streams, were measured at the outlet with the aid of a bubble flow meter. The feed and sweep inlet flow rates were adjusted to the desired level with the aid of an electronic flow transducer-controller combination for each line (Model 8141-0412 and rate 0 to 50 sccm, and 0 to 10 sccm; Matheson Gas Products of East Rutherford, N.J.). For pure component permeation experiments, the same procedure and set up as above were used with the only difference that the feed stream consisted of only a single component and the Varian 3700 gas chromatograph was not used.

Figure 3:
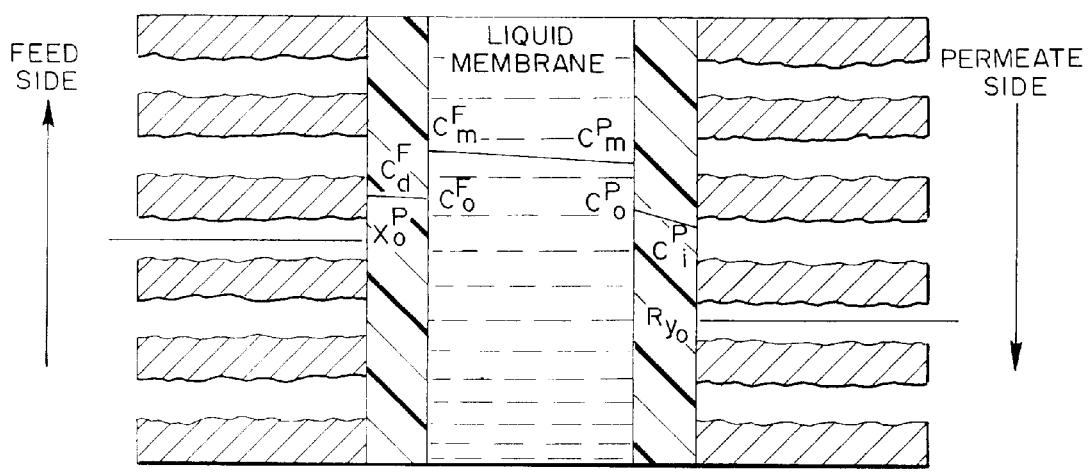
FIG. 3 is a schematic of a concentration profile of a certain species contained in the feed stream as it passes through the liquid membrane and is ultimately extracted by the sweep stream.

With particular attention being directed to FIG. 3 of the drawings, FIG. 3 shows a concentration profile of a solute as it permeates through the feed side silicone coating, through a non-reactive liquid membrane, and finally through the permeate side silicone coating. In the profile illustrated in FIG. 3, it will be understood that the hollow fibers for both the feed and sweep sides are fabricated in accordance with the disclosure of Nomura U.S. Pat. No. 4,824,444.

The use of silicone coated microporous hollow fibers in a hollow fiber contained liquid membrane (HFCLM) arrangement for the separation of high pressure $CO_2$—$N_2$ mixtures has yielded encouraging results. The inlet feed pressure was varied from 64 to 215 psia with the liquid membrane pressure maintained either above or below the feed pressure. The latter could not have been achieved if non-coated microporous hydrophobic hollow fibers were used in a HFCLM configuration. Further, the addition of the coating allowed the fibers to withstand considerably higher pressures. The highest pressures used earlier with uncoated fibers in HFCLM configuration was around 100 psia (S. Majumdar et al., "Liquid Membrane Purification of Biogas", prepared for the New York State Energy Research Development Authority, Report 91-9 (March 1991)).

The addition of the coating resistances to that of the liquid membrane did not increase substantially the total transport resistance of the system. The very small thickness of the silicone coatings, ⁻1 µm, made the contribution of their resistances less important.

In the case where the liquid membrane (water) was at a higher pressure than the feed, the permeate gas flow was substantially lower than that where the opposite pressure difference was applied; this indicated that the flow was purely diffusive. Permeate $CO_2$ compositions as high as 46.4% were achieved with a feed composition of 10.0 to 10.2% $CO_2$, balance $N_2$ and a feed pressure of 114.7 psia. For an inlet feed content of 38.89% $CO_2$, balance $N_2$, the highest composition of the permeate gas was 86.8% $CO_2$ at a feed pressure of 136.7 psia; the highest selectivity was 17 at a feed pressure of 66.7 psia. Additionally, coated fibers may be utilized with aqueous solutions of an alkali-metal carbonate or liquid such as aqueous solutions of diethanolamine and hindered amines for carbon dioxide separations from natural gas mixtures. Such operations are believed adaptable in ratios which are normally not feasible for economic reasons, and may prove useful for separation at smaller gas well sources. Additionally, sweep liquids of the type described by Guha et al., "Gas Separation Modes in a Hollow Fiber Contained Liquid Membrane Permeator", Ind. Eng. Chem. Res., Vol. 31, p. 593 (1992) may be employed in certain applications in lieu of the sweep gases.

The number of these gas separations is substantial, and includes, by way of example, carbon dioxide removal in order to up-grade sour natural gas for energy conservation, as well as for economic recovery from smaller deposits, such as for example, condensable hydrocarbons from natural gas including the recovery of certain gaseous species containing two or more carbon atoms.

Moisture-laden flue gases which contain nitrogen, sulfur dioxide, carbon dioxide, and residual oxygen may be used as a feed gas together with membrane liquids such as water, as well as aqueous solutions of sodium bisulfite, sodium sulfite, sulfolane, sulfolene, as well as ferrous and ferric ethylenediamine-tetraacetic acid (EDTA), i.e. ferric ethylenediamine-tetraacetic acid (ferris EDTA). Permeability levels for sulfur dioxide tend to be high, and mixtures of sulfur dioxide-carbon dioxide as well as sulfur dioxide-nitrogen selectivities may be obtained utilizing the immobilized liquid membranes listed above. It is recognized that removal of sulfur dioxide as well as other oxides of sulfur from flue gases or stack gases is an important consideration for the release of harmful emissions into the atmosphere.

EXAMPLE II

SEPARATION FOR FEED PRESSURE LESS THAN LIQUID MEMBRANE (20% DEA AQUEOUS SOLUTION) PRESSURE IN A PERMEATOR WITH TWO SETS OF COATED FIBERS

The choice of aqueous DEA (diethanolamine) to be used as a liquid membrane for the separation of $CO_2$—$N_2$ gas mixtures was made because of the encouraging results obtained by other investigators such as Guha et al., "Facilitated Transport of $CO_2$ Through Immobilized Liquid Membrane of Aqueous Diethanolamine", Ind. Eng. Chem. Res., Vol. 29, p. 2093 (1990) and Majumdar et al., "Liquid Membrane Purification of Biogas", Prepared for the New York State Energy Research Development Authority, Report 91-9, (March 1991). The particular concentration of DEA, that of 20%, was chosen because of the selectivity and the stability it exhibited when used as a liquid membrane in a HFCLM configuration by Majumdar et al., "Liquid Membrane Purification of Biogas", Prepared for the New York State Energy Research Development Authority, Report 91-9, (March 1991).

Table II hereinbelow depicts the results obtained from HFCLM studies when 20% DEA aqueous solution was the liquid membrane. The mode of operation was sweep gas (He), the feed consisted of 20% $CO_2$ balance $N_2$ and feed and sweep streams were completely humidified. The effect of feed pressure increases on $CO_2$ permeance (Q/δ), exiting $CO_2$ compositions and selectivity was studied.

The effect of feed pressure increase on Q/δ for $CO_2$—$N_2$ is shown in Table II hereinbelow. The values of Q/δ for $CO_2$ and $N_2$ show a significant decrease as the feed pressure increases; the Q/δ for $N_2$ decreases but not as much as those of $CO_2$ and when they are compared with the Q/δ values when water was the liquid membrane, they are less by a factor of almost six. The effect of pressure increases on the premeability coefficient, Q, for $CO_2$ and $N_2$ using 20% DEA aqueous solution impregnated in the pores of a flat Celgard film was studied by Guha et al. (1990 cited hereinabove). They reported that at high feed $CO_2$ partial pressure differences the liquid membrane lost its facilitation capabilities and the permeability values were governed by the reduction in solubility and diffusivity of species in that solution. It has been reported that the reduction in permeability of $N_2$ may be estimated by the salting out effect.

Table II hereinbelow also shows the effect of feed pressure increase on exit $CO_2$ compositions. The feed outlet $CO_2$ content does not show a significant decrease as the feed pressure increases mainly because of the small permeation area available. The sweep outlet $CO_2$ content, however, increases two-fold as the feed pressure increases from 65.7 to 164.7 psia.

The effect of the liquid membrane on the selectivity of the liquid membranes (20% DEA aqueous solution and coatings) are shown in Table II hereinbelow. The highest selectivity obtained here is 31.5 at a feed inlet $CO_2$ partial pressure of 10.0 psia. The selectivity of the system decreased to the value of 27.4 as the feed inlet $CO_2$ partial pressure was increased to 29.2 psia. In prior investigations, a gas mixture of $CO_2$—$N_2$ was used as the feed and an uncoated film, commercially available from Celanese Chemical Co. of New York under the name "Celgard 2400" and impregnated with 20% DEA aqueous solution, was used as an immobilized liquid membrane (ILM). Prior studies showed that the selectivity of the liquid membrane decreased dramatically as the partial pressure difference of $CO_2$ across the liquid membrane increased to about 15 psia. Above that pressure, the selectivity remained constant at a value of 55 (Guha et al., 1990, supra).

under conventional polymeric membrane mode of operation. For an inlet feed content of 38.89% $CO_2$ balance $N_2$, the highest composition of the permeate gas was 86.8% $CO_2$ at a feed pressure of 136.7 psia; the highest selectivity was 17

TABLE II

SEPARATION RESULTS USING A FEED CONSISTING OF 20.0% $CO_2$ BALANCE $N_2$ FOR SWEEP GAS (He) MODE OF OPERATION, AND 20% DEA AQUEOUS SOLUTION AS THE LIQUID MEMBRANE IN PERMEATOR 2

| $F_{in}/F_{out}{}^a$ pressure (psia) | $S_{in}/S_{out}{}^b$ pressure (psia) | Liq. mem.$^c$ pressure (psia) | $F_{in}/F_{out}{}^a$ flow rate (cm$^3$/min) | $S_{in}/S_{out}{}^b$ flow rate (cm$^3$/min) | $F_{out}$ % $CO_2$ | $S_{out}{}^d$ % $CO_2$ | $S_{out}{}^e$ % $N_2$ | $Q/\delta^f$ ($CO_2$) | $Q/\delta^f$ ($N_2$) | $\alpha^g$ $CO_2/N_2$ |
|---|---|---|---|---|---|---|---|---|---|---|
| 65.7/63.7 | 16.6/16.6 | 74.7 | 31.0/⁻31.0 | 3.36/⁻3.36 | 18.7 | 11.21 | 1.62 | 6.20E−6 | 1.97E−7 | 31.5 |
| 104.7/102.7 | 16.6/16.6 | 114.7 | 31.0/⁻31.0 | 3.36/⁻3.36 | 18.8 | 15.40 | 2.18 | 5.20E−6 | 1.67E−7 | 31.1 |
| 134.7/132.7 | 16.6/16.6 | 144.7 | 31.0/⁻31.0 | 3.43/⁻3.43 | 18.6 | 17.70 | 2.77 | 4.70E−6 | 1.68E−7 | 28.1 |
| 160.7/159.7 | 16.6/16.6 | 74.7 | 31.0/⁻31.0 | 3.43/⁻3.43 | 18.4 | 19.35 | 3.12 | 4.30E−6 | 1.56E−7 | 27.4 |

$^a$Feed inlet/Feed outlet
$^b$Sweep inlet/Sweep outlet
$^c$Liquid membrane
$^d$balance $N_2$ and He
$^e$balance $CO_2$ and He
$^f$cm$^3$/cm$^2$ S cmHg
$^g$Membrane selectivity for $CO_2/N_2$

EXAMPLES AND RESULTS

The use of silicone coated microporous hollow fibers in a hollow fiber contained liquid membrane (HFCLM) arrangement for the separation of high pressure $CO_2$—$N_2$ mixtures is encouraging. Inlet feed pressures were varied from 64 to 215 psia with the liquid membrane pressure maintained either above or below the feed pressure. The latter could not have been achieved if non-coated microporous hydrophobic hollow fibers were used in a HFCLM configuration. Further, the addition of the coating allowed the fibers to withstand considerably higher pressures. The highest pressures used earlier with uncoated fibers in HFCLM configuration was around 100 psia (Majumdar et al., 1991, supra).

The addition of the coating resistances to that of the liquid membrane did not increase substantially the total transport resistance of the system since the values of $Q/\delta$ of $C_2$ and $N_2$ through the ultra-thin silicone coating are much larger than those through relatively thick films of water or 20% DEA aqueous solution. The very small thickness of the silicone coatings, ⁻1 μm, made the contribution of their resistances less important.

In the conventional polymeric membrane mode of operation, the coating on both feed and sweep sides acted as the main barrier of separation when the liquid membrane pressure was less than that of the feed, suggesting that the gas bubbled through the liquid membrane from the feed to the permeate side. The variation of the feed pressure, as the difference between the feed and the liquid membrane pressures remained almost constant, resulted in a possible combination of diffusive and convective gas flow from the feed to the permeate side. The permeate flux increased although the difference between the two pressures (feed and liquid membrane) remained almost the same.

In the case where the liquid membrane (water) was at a higher pressure than the feed, the permeate gas flow was substantially lower than that where the opposite pressure difference was applied; this indicated that the flow was purely diffusive. Permeate $CO_2$ compositions as high as 46.4% were achieved with a feed composition of 10.0 to 10.2% $CO_2$ balance $N_2$ and a feed pressure of 114.7 psia. The highest membrane selectivity for the system was 20.0 at a feed pressure of 66.7 psia. In the permeator in which only the permeate fibers were coated, the liquid membrane pressure was always higher than that of the feed and He gas was used as a sweep. This, however, did not improve the separation significantly. The substitution of water with 20% DEA aqueous solution did improve the selectivity of the system. Selectivities as high as 31.5 were achieved at a feed inlet $CO_2$ partial pressure of 10.0 psia under sweep gas mode of operation.

The use of coated fibers suggests inclusion of liquid membranes other than water or aqueous solutions since one of the main uses of the coated fibers in this configuration (HFCLM) is to prevent liquids from entering into hollow fiber bores. Feed mixtures which include condensable gases could be separated when pure high molecular weight hydrocarbons are used as liquid membranes. These liquid membranes could include such liquids as decane, kerosene, and the like for the separation of methane from ethane, propane, and the like.

In addition, it is possible to modify the system by imposition of a vacuum on the sweep side of the permeator in order to more expeditiously remove the separated gases. This is a feature which may be employed in the system by those skilled in the art utilizing conventional vacuum techniques.

It will be understood that the various aspects of the present invention are set forth in the appended claims.

What is claimed is:

1. The method of gaseous component separation of at least one gaseous component from a feed gas comprising a mixture of gases in a hollow fiber liquid membrane system employing a rigid treatment chamber enclosing a first and a second plurality of elongated hydrophobic microporous hollow fibers, a liquid membrane barrier, and a sweep fluid, and comprising the steps of:

(a) selecting a predetermined sweep fluid;
   (b) providing a treatment zone disposed within said rigid treatment chamber, with the rigid treatment chamber enclosing said first and said second plurality of elongated hydrophobic microporous hollow fibers, each having a non-porous coating thereon and with the non-porous coating being on the outer surface of said elongated hydrophobic microporous hollow fibers and in direct communication with the hollow interior thereof, said rigid treatment chamber comprising an elongated enclosure with an axis, side walls defining an elongated cylindrical chamber for retaining said pluralities of elongated hydrophobic microporous hollow fibers with a non-porous coating thereon in a configuration to extend generally along the axis of said elongated chamber, said chamber having opposed end walls with ports formed therewithin and including a feed gas inlet port, a liquid membrane reservoir retaining a supply of liquid membrane therein and with the liquid membrane being in communication with said rigid treatment chamber through a liquid membrane inlet port disposed at a first end of said rigid treatment chamber, said rigid treatment chamber further having a sweep fluid outlet port at said first end, and with a sweep fluid inlet port, a feed gas outlet port, and a liquid membrane outlet port at the opposed end thereof;

(c) said first and second pluralities of elongated hydrophobic microporous hollow fibers extending between said feed gas and sweep fluid inlet ports and feed gas and sweep fluid outlet ports, with said first plurality of hollow fibers coupled to said feed gas ports and with said second plurality of hollow fibers coupled to said sweep fluid ports, and with said pluralities of fibers arranging for counter-current flow of said mixture of gases comprising said feed gas and said predetermined sweep fluid therethrough;

(d) delivering a liquid membrane, a feed gas and said predetermined sweep fluid into each of said liquid membrane inlet port, feed gas inlet port and predetermined sweep fluid in let ports respectively, with the liquid membrane being in surface-to-surface contact with the non-porous coating on each of said pluralities of elongated hydrophobic microporous hollow fibers with a non-porous coating thereon, and wherein the partial pressure of the component of said feed gas to be selectively removed from the feed gas and passing through said first plurality of fibers is controllably maintained to be higher than that partial pressure in said predetermined sweep fluid within said second plurality of fibers, and wherein the static pressure of said membrane liquid within said rigid treatment chamber is maintained at a level which is substantially higher than the static pressure maintained within the hollow interior of either of said pluralities of microporous hollow fibers containing said mixture of gases comprising and present within said feed gas or said predetermined sweep fluid.

2. The method as defined in claim 1 being particularly characterized in that said rigid treatment chamber is an elongated tube with a metallic shell and a lining of polytetrafluoroethylene.

3. The method as defined in claim 1 being particularly characterized in that means are provided to pressurize said membrane liquid with an inert gas at a selected and controlled pressure for continuous movement of said membrane liquid through said rigid treatment chamber, said controlled pressure being effective to raise the static pressure of said membrane liquid to a level substantially greater than the static pressure within either plurality of elongated hydrophobic microporous hollow fibers with a non-porous coating thereon containing said feed gas and sweep fluid.

4. The method of claim 3 wherein the static pressure in said membrane liquid is maintained at a level which is in excess of 100 psia over that of the sweep fluid within said second plurality of hollow fibers.

\* \* \* \* \*